(12) United States Patent
Yamamoto et al.

(10) Patent No.: US 7,849,749 B2
(45) Date of Patent: Dec. 14, 2010

(54) PRESSURE SENSOR MODULE

(75) Inventors: Satoshi Yamamoto, Sakura (JP); Mikio Hashimoto, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 12/473,822

(22) Filed: May 28, 2009

(65) Prior Publication Data

US 2009/0235753 A1    Sep. 24, 2009

Related U.S. Application Data

(63) Continuation of application No. PCT/JP2007/072035, filed on Nov. 13, 2007.

(30) Foreign Application Priority Data

Nov. 29, 2006 (JP) .............................. 2006-321896

(51) Int. Cl.
G01M 17/02 (2006.01)
(52) U.S. Cl. .............................. 73/727; 73/754; 73/756
(58) Field of Classification Search ........................ None
See application file for complete search history.

(56) References Cited

U.S. PATENT DOCUMENTS 7,210,357 B2    5/2007    Tanaka et al.

2005/0204822 A1 *  9/2005  Schumacher .................. 73/718
2006/0185437 A1    8/2006  Sato et al.

FOREIGN PATENT DOCUMENTS

| JP | 04-095740 A | 3/1992 |
|---|---|---|
| JP | 3602238 B2 | 8/1997 |
| JP | 11-326088 A | 11/1999 |
| JP | 2005-091166 A | 4/2005 |
| JP | 2006-177925 A | 7/2006 |
| WO | 2004/068096 A1 | 8/2004 |
| WO | 2007/083748 A1 | 7/2007 |

* cited by examiner

*Primary Examiner*—Andre J Allen
(74) *Attorney, Agent, or Firm*—Sughrue Mion, PLLC

(57) ABSTRACT

A pressure sensor module of the invention includes a pressure sensor and a laminar substrate. Electrodes are arranged in the vicinity of a diaphragm portion of the pressure sensor. In the laminar substrate, a plurality of substrates are laminated, and the laminar substrate incorporates the pressure sensor. One face of the diaphragm portion is exposed by a space portion. According to the invention, it is possible to provide a pressure sensor module which facilitates smaller and thinner sizes, and which enables high-density packaging.

6 Claims, 11 Drawing Sheets

PRESSURE SENSOR MODULE

TECHNICAL FIELD

The present invention relates to a pressure sensor module provided with a pressure sensor using a substrate composed of a semiconductor.

This application claims priority from Japanese Patent Application No. 2006-321896 filed on Nov. 29, 2006, the content of which is incorporated herein by reference.

BACKGROUND ART

As a compact, high-precision pressure sensor, for example, a piezo resistance type pressure sensor is known in which a diaphragm portion where a portion of the semiconductor substrate is sheeted is formed, and the pressure imparted to this diaphragm portion is detected.

Since stand-alone output voltage is small at several mV to several tens of mV, this type of pressure sensor may require a circuit for amplifying this weak output voltage depending on the application. Moreover, since the voltage outputted from this pressure sensor fluctuates according to ambient temperature, it is also necessary for purposes of detecting accurate pressure to have a circuit which compensates for fluctuations in output voltage due to temperature. There are known to be pressure sensor modules which mount a pressure sensor as well as the output voltage amplification circuit, temperature compensation circuit and the like on a printed board (e.g., see Patent Document 1).

[Patent Document 1] Japanese Patent, Publication No. 3602238

DISCLOSURE OF THE INVENTION

Problems to be Solved by the Invention

However, conventional pressure sensor modules are formed such that a pressure sensor and, for example, an ASIC (Application Specific Integrated Circuit) chip provided with an output voltage amplification circuit, temperature compensation circuit and the like are mounted on a printed circuit board, and the pressure sensor and the ASIC chip or external connection terminal are connected by wire bonding.

As a result of this structure, conventional pressure sensor modules are limited in terms of compactness, and particularly impede obtainment of thinner thickness, with the result that their scope of use is limited. Consequently, it would be desirable to have a pressure sensor module which facilitates incorporation into thinner equipment and the like, and which enables compact and high-density packaging.

The present invention was devised in view of the above circumstances, and has as an object the provision of a pressure sensor module which facilitates smaller and thinner sizes, and which enables high-density packaging.

Means for Solving the Problems

The pressure sensor module of the present invention includes: a pressure sensor which has a diaphragm portion where a portion of a semiconductor substrate is sheeted, and which has an electrode arranged in the vicinity of the diaphragm portion; and a laminar substrate which incorporates the pressure sensor, and which has a space portion that exposes at least one face of the diaphragm portion and a wiring portion that is electrically connected to the electrode.

In the pressure sensor module of the present invention, it is preferable that a pressure inlet hole which allows communication of the space portion and the exterior of the laminar substrate be provided in the laminar substrate.

In the pressure sensor module of the present invention, it is preferable to further include: an insulator which is disposed in a peripheral region of the semiconductor substrate excluding the diaphragm portion; and a conductor which is disposed on the insulator and which electrically connects the electrode and the wiring portion.

In the pressure sensor module of the present invention, it is preferable that at least a portion of the pressure inlet hole that connects with the space portion extend in a direction along the one face of the diaphragm portion.

In the pressure sensor module of the present invention, it is preferable that the insulator be divided into a plurality of insular parts.

ADVANTAGEOUS EFFECTS OF THE INVENTION

According to the pressure sensor module of the present invention, by forming a space portion which causes the pressure sensor to be incorporated into the laminar substrate, it is possible to provide a pressure sensor module which enables high-density packaging, and which obtains significantly greater compactness and thinness compared to conventional pressure sensor modules which mount the pressure sensor outside the substrate. Moreover, as the space portion of the pressure sensor module is formed so as to expose at least one face of the diaphragm portion, the pressure sensor is able to reliably detect the pressure imparted to the diaphragm portion in a state where the pressure sensor is located within the laminar substrate.

Furthermore, by forming a wiring portion in the laminar substrate which electrically connects with the electrodes of the pressure sensor, it is possible to directly connect the output current from the pressure sensor to an output voltage amplification circuit, temperature compensation circuit and the like formed in the laminar substrate without resorting to a connection method such as wire bonding, thereby enabling enhancement of reliability as well as obtainment of significantly greater compactness and thinness of the pressure sensor module.

DESCRIPTION OF THE REFERENCE SYMBOLS

10 PRESSURE SENSOR MODULE
11 PRESSURE SENSOR
12 SEMICONDUCTOR SUBSTRATE
14 DIAPHRAGM PORTION
16 INSULATING FILM
17 ELECTRODE
21 LAMINAR SUBSTRATE
22 SPACE PORTION
23 WIRING PORTION
82 CONDUCTOR
105a-105d INSULAR PART

BEST MODE FOR CARRYING OUT THE INVENTION

Below, pressure sensor modules according to the present invention are described with reference to drawings based on the best modes for carrying out the invention. The below-described embodiments are specific examples of configuration of the present invention, and do not limit the present invention in the absence of specific qualifications.

First Embodiment (1) Pressure Sensor Module

Figure 1:
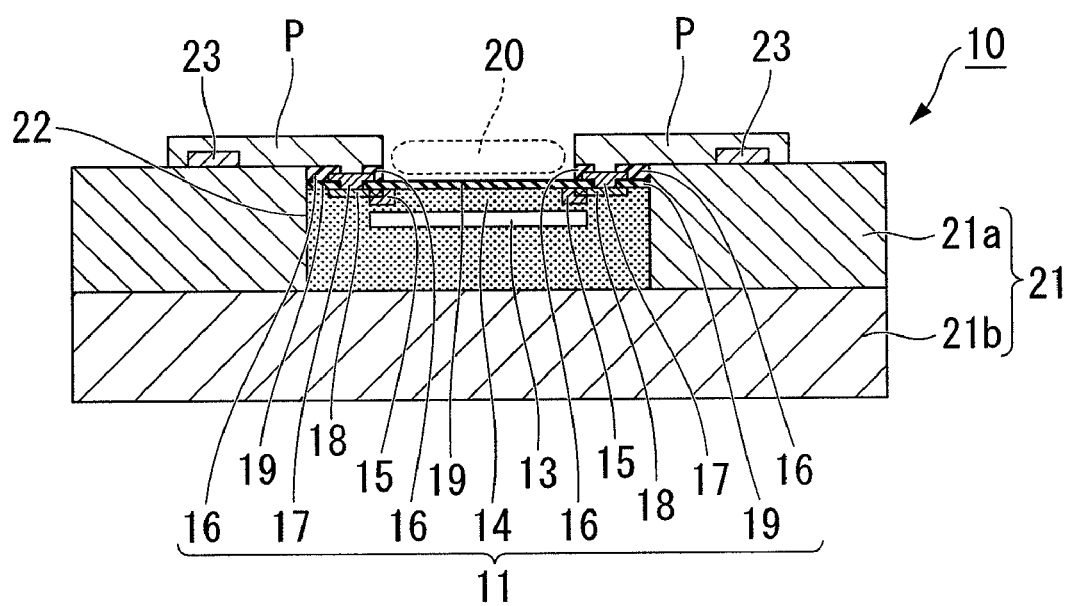
FIG. 1 is a sectional view illustrating one example of a pressure sensor module according to the present invention.
Figure 2A:
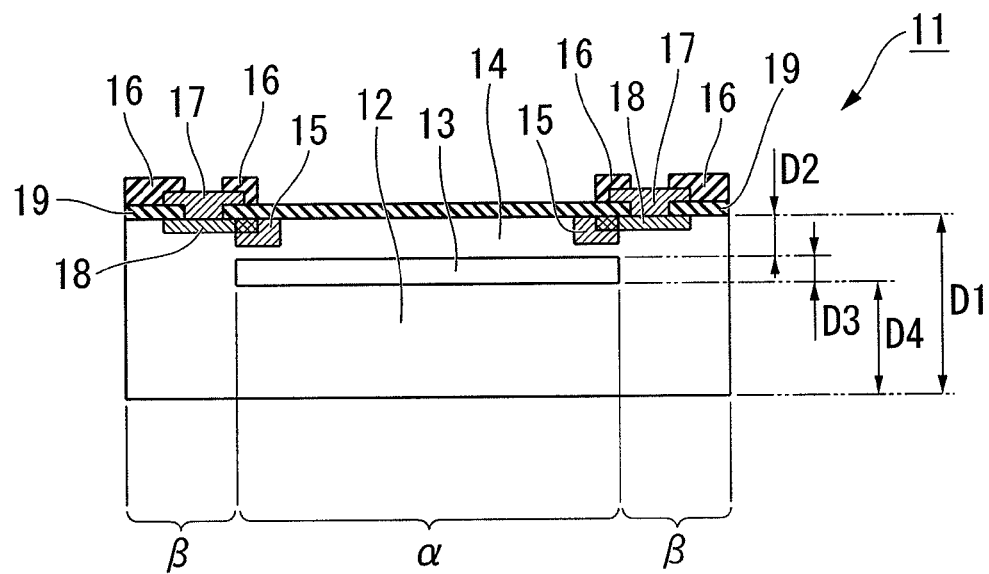
FIG. 2A is a sectional view illustrating a pressure sensor which configures a pressure sensor module according to the present invention.
Figure 2B:
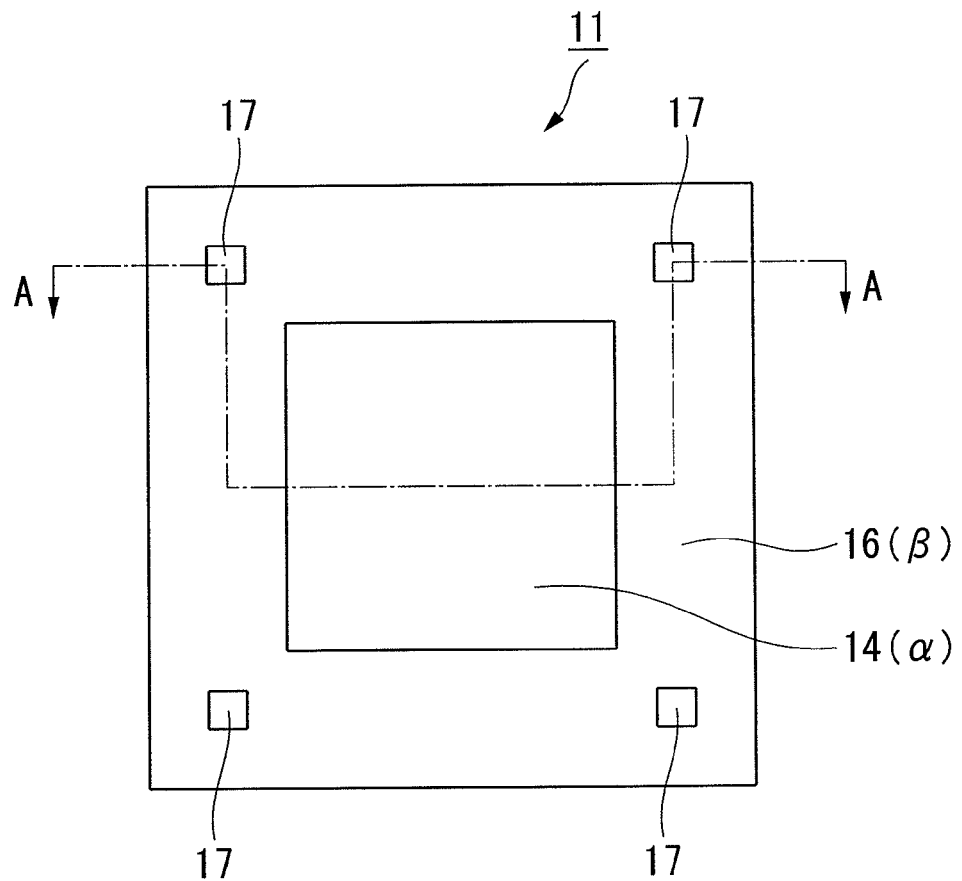
FIG. 2B is a plan view illustrating a pressure sensor which configures a pressure sensor module according to the present invention.

FIG. 1 is a sectional view illustrating one example (hereinafter "first embodiment") of a pressure sensor module according to the present invention. FIG. 2A is a sectional view and FIG. 2B is a plan view of a pressure sensor which configures this pressure sensor module.

As illustrated in FIG. 1, a pressure sensor module 10 of the present invention includes at least a pressure sensor 11 which has a diaphragm portion 14 where a part of a semiconductor substrate 12 is sheeted and which has electrodes 17 arranged in the vicinity of the diaphragm portion 14, and a laminar substrate 21 which incorporates the pressure sensor 11, and which has a space portion 20 that exposes at least one face of the diaphragm portion 14 and wiring portions 23 that electrically connect with the electrodes 17. Furthermore, the electrodes 17 and the wiring portions 23 are electrically connected by using a conductive paste P or the like.

(2) The Respective Components (2-1) Laminar Substrate

The laminar substrate 21 of FIG. 1 is an example of a configuration where two substrates 21a and 21b are laminated together. The laminar substrate of the present invention may be created by lamination of at least two substrates composed of identical material or different materials, and there is no particular limit on the number of substrates which may be provided by lamination. That is, while a laminar substrate composed of two substrate layers is illustrated in this first embodiment, it is also acceptable to have a laminar substrate which is arranged by lamination of multiple substrates in three layers or more. Furthermore, a known material such as a flexible printed substrate or a rigid substrate may be employed as the substrate.

(2-2) Space Portion

The space portion 20 refers to a space located at a position which exposes at least one face of the diaphragm portion 14, which configures the pressure sensor 11, located on the exterior side. The space portion of the present invention may be either an open-type space portion which exposes at least one face of the diaphragm portion to the outside, or a sealed-type space portion which exposes at least one face of the diaphragm portion to a sealed space inside the laminar substrate.

(2-3) Pressure Sensor

As shown in FIG. 2A, the pressure sensor 11 has a side profile which is rectangular. The pressure sensor 11 is provided with a space (standard pressure chamber) 13 which extends inside the semiconductor substrate 12; the sheeted region on top of the space 13 is used as the diaphragm portion 14. That is, the space portion 20 which constitutes a region on the outside and the space 13 which extends inside the semiconductor substrate 12 are positioned so as to sandwich the diaphragm portion 14. This pressure sensor 11 is incorporated into the laminar substrate 21. In the present invention, the incorporation of the pressure sensor 11 has various modes described below (the first embodiment is an embodiment of the below-mentioned A mode).

A. a mode where the pressure sensor is housed in the laminar substrate, except for a face of the diaphragm portion located on the exterior, which is exposed by the space portion.

B. a mode where the pressure sensor is housed in the laminar substrate, except for a face of the diaphragm portion located on the exterior, which is exposed by the space portion, and a portion of the side faces which are connected thereto.

C. a mode where the pressure sensor is housed so that it extends across multiple laminated substrates.

D. a mode where the pressure sensor is housed by multiple substrates which are aligned so as to be adjacent along the surface.

(2-4) Other Components

The wiring portions 23, which electrically connect with the electrodes 17 of the pressure sensor 11, are arranged in the laminar substrate 21. The wiring portion 23 connects the pressure signals from the pressure sensor 11 outputted by the electrode 17 to an amplification circuit, temperature compensation circuit or the like formed in the laminar substrate 21 via the conductive paste P or the like.

The pressure sensor module of the present invention is at least provided with a configuration as above.

(3) Effects of the First Embodiment

According to the pressure sensor module 10 of the first embodiment, by incorporating the pressure sensor 11 into the laminar substrate 21, and by exposing at least one face of the diaphragm portion 14 by means of the space portion 20, it is possible to obtain a major increase in compactness and thinness compared to conventional pressure sensor modules where the pressure sensor is mounted outside the substrate. As at least one face of the diaphragm portion 14 is exposed to the outside by the space portion 20, the pressure sensor 11 is able to accurately detect any pressure imparted to the diaphragm portion 14 even in a state where the pressure sensor 11 is incorporated into the laminar substrate 21.

In addition, by forming the wiring portions 23—which electrically connect with the electrodes 17 of the pressure sensor 11 via the paste P or the like—in the laminar substrate 21, the signals outputted from the pressure sensor 11 can be directly connected to an output voltage amplification circuit, temperature compensation circuit or the like via a conductive member formed in the laminar substrate 21 without use of a connection method such as wire bonding. Consequently, it is possible to enhance reliability by suppressing the occurrence of defects such as a disconnection due to external causes which constitutes a conventional problem with wire bonding and the like.

(4) Configuration of Pressure Sensor

FIG. 2A is a schematic sectional view and FIG. 2B is a schematic plan view illustrating one example of the pressure sensor 11 incorporated within the laminar substrate 21, with FIG. 2A representing a cross-section along line A-A shown in FIG. 2B. That is, FIG. 2B shows the face on which the diaphragm portion is provided.

The pressure sensor 11 is provided with the space (standard pressure chamber) 13 that is disposed inside the central region of the semiconductor substrate 12, and extends approximately in parallel with one face of the semiconductor substrate 12. The sheeted region located above the space 13 is employed as the diaphragm portion 14, and pressure-sensitive elements 15 are arranged in the diaphragm portion 14. The pressure-sensitive elements 15 are formed by means of diffusion of boron or the like. The electrodes 17 which are arranged in a peripheral region A, which is a region of the semiconductor substrate 12 excluding the diaphragm portion 14, and which are electrically connected to each of the pressure-sensitive elements 15 are provided on the one face of the semiconductor substrate 12. The pressure-sensitive elements 15 and the electrodes 17 are connected with each other via wiring 18 or the like formed by means of diffusion. An oxide film 19 is formed on the one face of the semiconductor substrate 12 and an aperture is provided in the oxide film 19 at a position corresponding to the position of the electrode 17. An insulating film (passivation film) 16 that is made of an oxide film, a nitride film or the like having apertures is formed on a part of the electrode 17.

It is acceptable that the insulating film 16 is not provided on the diaphragm portion 14. By not providing the insulating film 16 on the diaphragm portion 14, it is possible to suppress influence of stress due to the insulating film.

Figure 3:
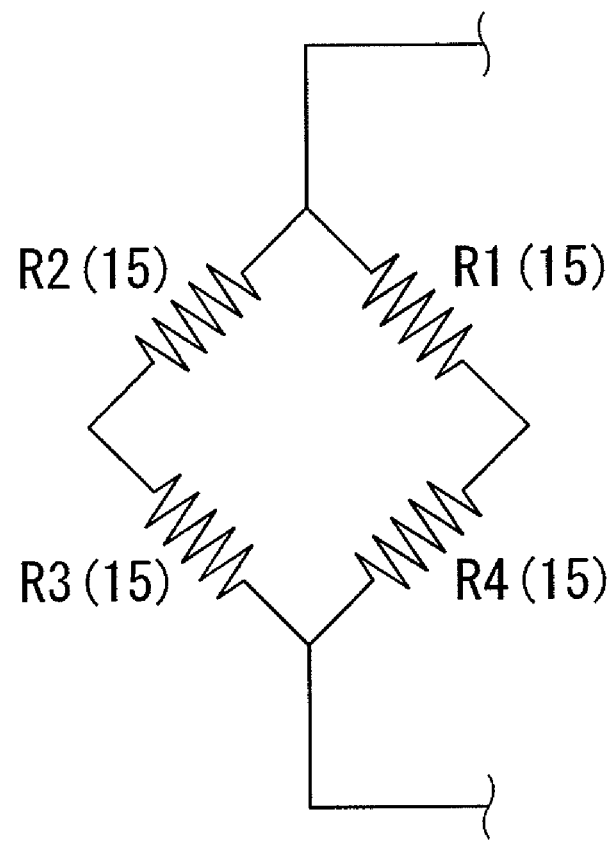
FIG. 3 is an electrical wiring diagram of a pressure-sensitive element (gage resistances).

The pressure sensor 11 shown in FIGS. 2A and 2B is a case where gage resistances (R1 to R4) which function as pressure-sensitive elements 15 are provided, and where each gage resistance is electrically connected so as to configure a Wheatstone bridge (FIG. 3). The pressure-sensitive elements 15 configured in this manner may be arranged at the periphery of the diaphragm portion 14. As compressive stress and tensile stress both tend to be imparted to the pressure-sensitive elements 15 at the periphery of the diaphragm portion 14, a pressure sensor with satisfactory sensitivity is obtained.

In this instance, as shown in FIG. 2A, with respect to the pressure sensor 11, when the thickness of the semiconductor substrate 12 in the peripheral region β is defined as D1, the thickness of the diaphragm portion 14 as D2, the height of the space 13 as D3, and the thickness of the part of the semiconductor substrate 12 excluding D2 and D3 as D4, it is acceptable if $(D2+D3) \ll D4$, and $D1 \approx D4$. D1 to D4 may be suitably selected so as to satisfy the above two formulas.

If D1 to D4 satisfy the above two formulas, the pressure sensor 11 is designed so that, in the central region a of the semiconductor substrate 12, thickness D2 of a diaphragm portion 14 is very thin and height D3 of a space 13 is very low and, underneath, thickness D4 of the residual part of the semiconductor substrate 12 is adequately thick compared to D2 and D3, when viewed in the thickness direction from one face of the semiconductor substrate 12. That is, this thickness D4 has approximately the same value as the thickness D1 of the semiconductor substrate 12 in the peripheral region β. In this instance, appellations are used which distinguish between a central region and a peripheral region, but both regions are configured from a single, integrated semiconductor substrate.

By adopting a pressure sensor with a configuration like the above, an extremely compact pressure sensor is obtained whose lateral profile is rectangular. As a result, it is possible to easily and stably incorporate the pressure sensor 11 into the laminar substrate 21.

(5) Pressure Sensor Manufacturing Method

As regards the manufacturing method of the pressure sensor 11 which configures the pressure sensor module 10 of the present invention, first, the space (standard pressure chamber) 13 is formed inside the semiconductor substrate 12. As to the formation method of the space (standard pressure chamber) 13, for example, the method disclosed by S. Armbruster et al. (S. Armbruster et al., "A Novel Micromachining Process for the Fabrication of Monocrystalline SI-Membranes using Porous Silicon," Digest of Technical Papers Transducers '03, 2003, pp. 246) may be used. By this means, the space (standard pressure chamber) 13 and diaphragm portion 14 are formed inside the semiconductor substrate 12.

Next, the oxide film 19 and the electrodes 17 are formed on one face of the semiconductor substrate, and then, the insulating film 16 is formed thereon in the region excluding the diaphragm portion 14 of the pressure sensor 11. For example, after once forming a film on the entire face of the semiconductor substrate 12 including the diaphragm portion 14 using CVD apparatus or the like, exposure development is conducted to remove only a part of the film on the diaphragm portion 14, and the remainder in peripheral region is used as the insulating film 16. At this time, by also simultaneously removing a part of the film from the regions where the electrodes 17 are formed, apertures for electrically connecting to the exterior can be formed, thereby obtaining the pressure sensor 11.

It is acceptable to arrange the obtained pressure sensor 11 inside a space portion 22 formed in the laminar substrate 21 when forming the laminar substrate 21, and further to electrically connect the electrodes 17 and the wiring portions 23 formed in the laminar substrate 21 via the conductive paste P or the like. By this means, it is possible to obtain a thinner, more compact pressure sensor module 10 in which the pressure sensor 11 is incorporated into the laminar substrate 21. Aboard to one face of which copper is applied may be used as the laminar substrate 21. In this board, copper thin film is provided on one face of an insulating layer formed of a polyimide resin film or the like. Moreover, for example, in the laminar substrate, substrates may be laminated via a heat-curable epoxy resin. Alternatively, a prepreg substrate of a half-curing state may be used as the laminar substrate 21. By employing such substrates, since it is possible to completely fill a gap between the pressure sensor 11 and the laminar substrate 21, reliability of wiring by the conductive paste P or the like is enhanced.

Figure 11A:
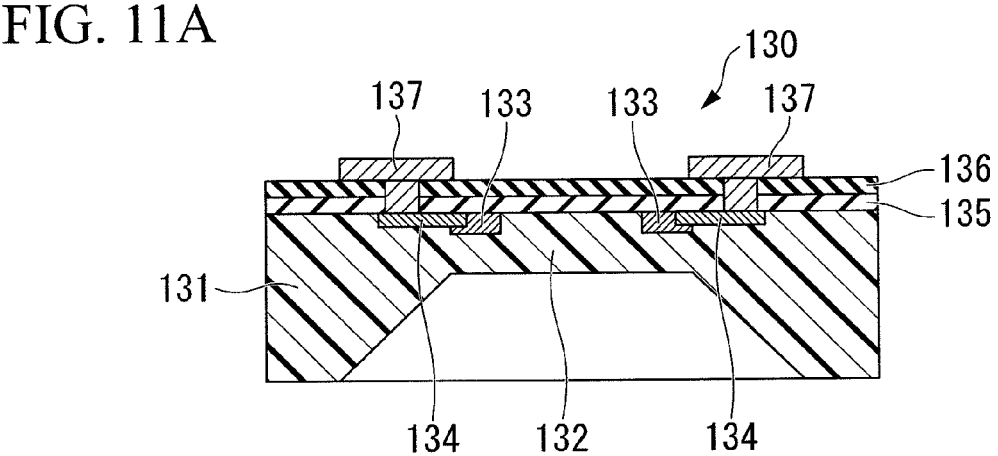
FIG. 11A is a sectional view illustrating another example of a pressure sensor according to the present invention.

As a pressure sensor applicable to the pressure sensor module 10 of the present invention, apart from the pressure sensor of the mode shown in FIG. 2A and FIG. 2B, one may also cite, for example, a pressure sensor (FIG. 11B, FIG. 11C) which applies innovations to the conventional type of pressure sensor shown in FIG. 11A. A pressure sensor 130 of FIG. 11A is formed in a semiconductor substrate 131, and has a sheeted diaphragm portion 132 formed by etching from the rear face side of the semiconductor substrate 131, and a plurality of gage resistances (pressure-sensitive elements) 133 formed on the front face of the semiconductor substrate 131. The plurality of gage resistances 133 are formed, for example, by means of diffusion of boron or the like, and electrically connects with electrodes 137 arranged in peripheral region of the diaphragm portion 132. The gage resistance 133 and the electrode 137 are electrically connected with each other via wiring 134 or the like formed by means of diffusion. A passivation film such as an oxide film 135 and a nitride film 136 is formed on the diaphragm portion. The plurality of gage resistances 133 are electrically connected so as to configure a Wheatstone bridge. When the diaphragm portion 132 bends upon receiving pressure, stress occurs at each gage resistance 133 corresponding to the amount of bending of the diaphragm portion 132, and the resistance values of the gage resistances 133 change corresponding to this stress. The pressure sensor 130 detects pressure by extracting these resistance value variations as electrical signals.

Figure 11B:
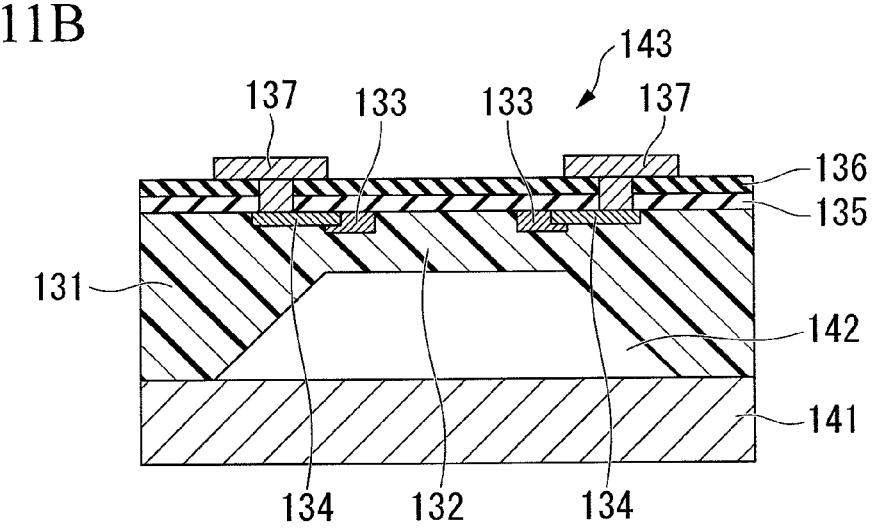
FIG. 11B is a sectional view illustrating another example of a pressure sensor according to the present invention.

Using a pressure sensor like that shown in FIG. 11A, as shown in FIG. 11B, another substrate 141 is further joined to the rear face of the semiconductor substrate 131 provided with the sheeted diaphragm portion 132 to form a space (standard pressure chamber) 142, thereby enabling formation of a pressure sensor 143 of the absolute pressure type.

Figure 11C:
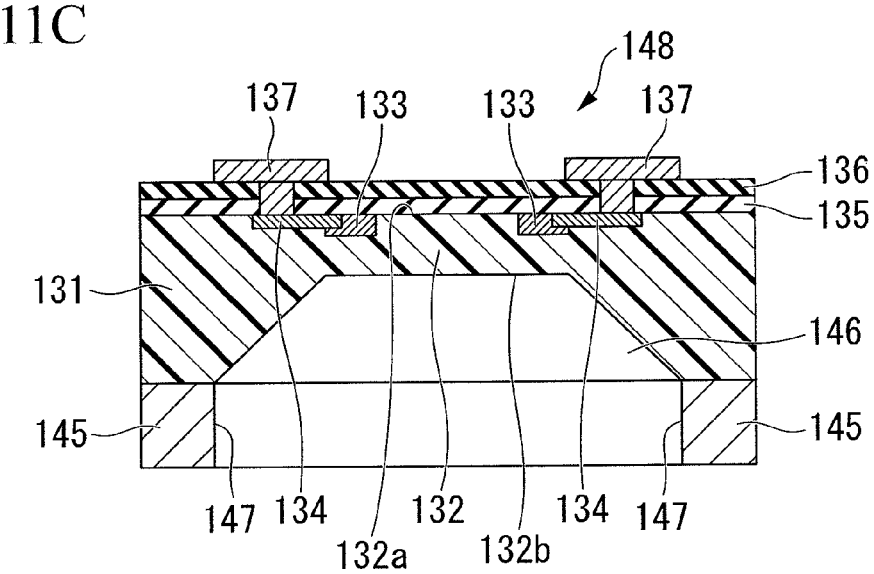
FIG. 11C is a sectional view illustrating another example of a pressure sensor according to the present invention.

Furthermore, as shown in FIG. 11C, another substrate 145 may be joined to the rear face of the semiconductor substrate 131 provided with the sheeted diaphragm portion 132, and a pressure inlet port 147 extending toward a space 146 facing the diaphragm portion 132 may be provided from the rear face of the substrate 145, thereby obtaining a pressure sensor 148. According to the pressure sensor 148 of this configuration, it is possible to form a pressure sensor 148 of the differential pressure type which enables measurement of the pressure difference between one face 132a side and another face 132b side of the diaphragm portion 132.

Below, several other embodiments of the pressure sensor module of the present invention are enumerated. In embodiments below, reference numerals that are the same as those in the above-described embodiment (the configuration of a pressure sensor, etc.) denote the same constitutions as the above-described embodiment, and so overlapping explanations thereof will be omitted.

Second Embodiment

Figure 4:
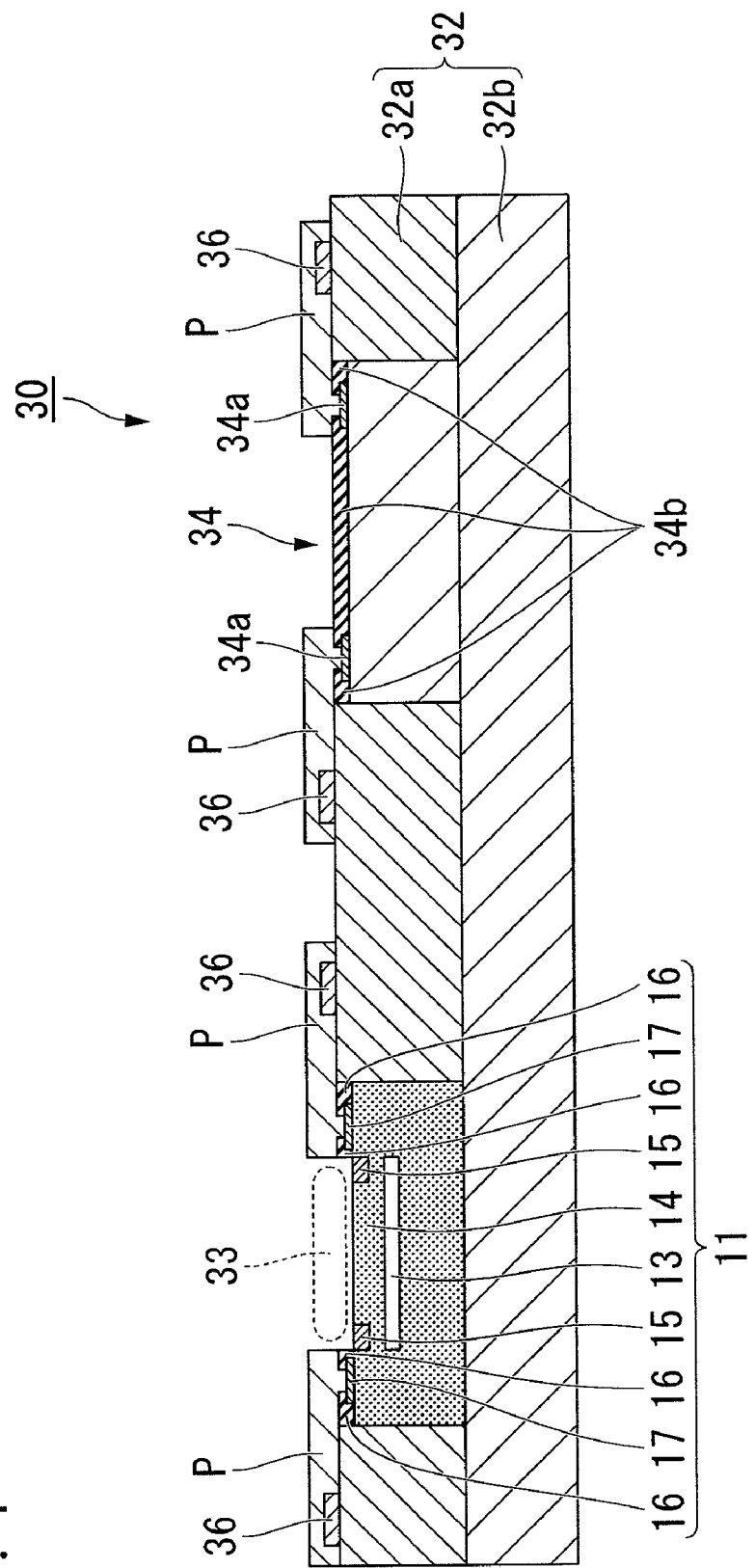
FIG. 4 is a sectional view illustrating another example of a pressure sensor module according to the present invention.

FIG. 4 is a sectional view illustrating another embodiment (hereinafter "second embodiment") of a pressure sensor module of the present invention. In this drawing, an oxide film 19 on a diaphragm portion and wiring 18 formed by means of diffusion are omitted. In a pressure sensor module 30 of the second embodiment, the pressure sensor 11 is incorporated into a laminar substrate 32 composed of two substrates 32a and 32b, and a space portion 33 is formed so as to expose one face of the diaphragm portion 14 of the pressure sensor 11. In addition, an ASIC 34, which is provided with a control circuit for controlling the pressure sensor 11, is incorporated into the laminar substrate 32. The electrodes 17 of the pressure sensor 11 and electrodes 34a of the ASIC 34 are electrically connected with wiring portions 36 formed in the laminar substrate 32. The wiring portion 36 is electrically connected with the electrode 17 and the electrode 34a of the ASIC 34 by using a conductive paste P or the like. The wiring portions are connected with each other via another wire circuit (not shown). An insulating film 34b (passivation film) that has an aperture formed on a part of the electrode 34a is formed on one face of the ASIC 34. Furthermore, in this embodiment, a laminar substrate that is the same as the laminar substrate of the first embodiment is employed.

According to the pressure sensor module 30 of the second embodiment, by incorporating the pressure sensor 11 and the ASIC 34 which is provided with the control circuit (for example, an amplification circuit or temperature compensation circuit) for controlling this pressure sensor 11 into the laminar substrate 32, it is not necessary to externally provide a control circuit or the like which controls the pressure sensor 11. Accordingly, it is possible to integrally provide in one package the pressure sensor 11 and the control circuit of this pressure sensor 11, and to obtain a thinner and more compact pressure sensor module 30.

Third Embodiment

Figure 5A:
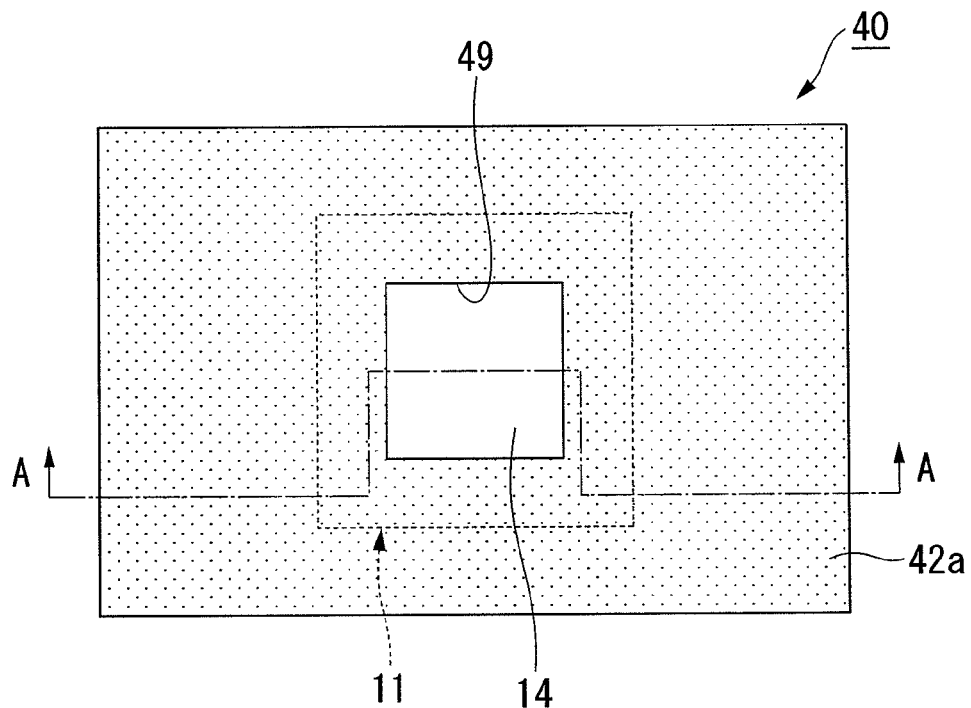
FIG. 5A is a plan view illustrating another example of a pressure sensor module according to the present invention.
Figure 5B:
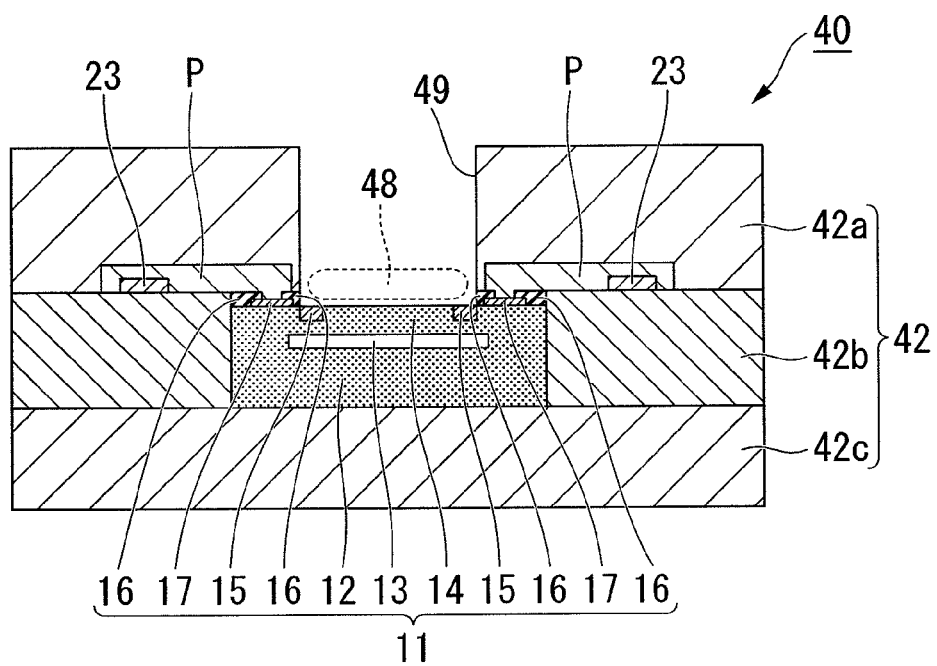
FIG. 5B is a sectional view illustrating another example of a pressure sensor module according to the present invention.

FIGS. 5A and 5B are views illustrating another embodiment (hereinafter "third embodiment") of the pressure sensor module of the present invention. FIG. 5A is a plan view which views the pressure sensor module from above, while FIG. 5B is a sectional view along line A-A shown in FIG. 5A. In these drawings, an oxide film 19 on a diaphragm portion and wiring 18 formed by means of diffusion are omitted. A pressure sensor module 40 of the third embodiment is provided with a pressure sensor 11 and a laminar substrate 42 which laminates substrates 42a, 42b and 42c in three layers, where the pressure sensor 11 is incorporated into the middle layer, that is, substrate 42b. A space portion 48 which exposes the diaphragm portion 14 of this pressure sensor 11 is also formed. Moreover, a pressure inlet hole 49 which allows the space portion 48 to communicate with the exterior of the laminar substrate 42 is formed in the substrate 42a which is laminated onto the substrate 42b. By this means, one face of the diaphragm portion 14 configuring the pressure sensor 11 is connected to the exterior of the laminar substrate 42 via the space portion 48 and the pressure inlet hole 49. Furthermore, in this embodiment, a laminar substrate that is the same as the laminar substrate of the first embodiment is employed.

According to the pressure sensor module 40 of the third embodiment, it is possible to detect the external pressure of the laminar substrate 42, because the diaphragm portion 14 communicates with the exterior of the laminar substrate 42 via the pressure inlet hole 49 even when the pressure sensor 11 is incorporated into the middle of the laminar substrate 42 and one face of the diaphragm portion 14 is not directly exposed to the exterior of the laminar substrate 42. Moreover, by incorporating the pressure sensor 11 in the middle of the laminar substrate 42, it is possible to prevent breakage due to imposition of mechanical stress from the outside relative to breakable parts such as the diaphragm portion 14.

Fourth Embodiment

Figure 6:
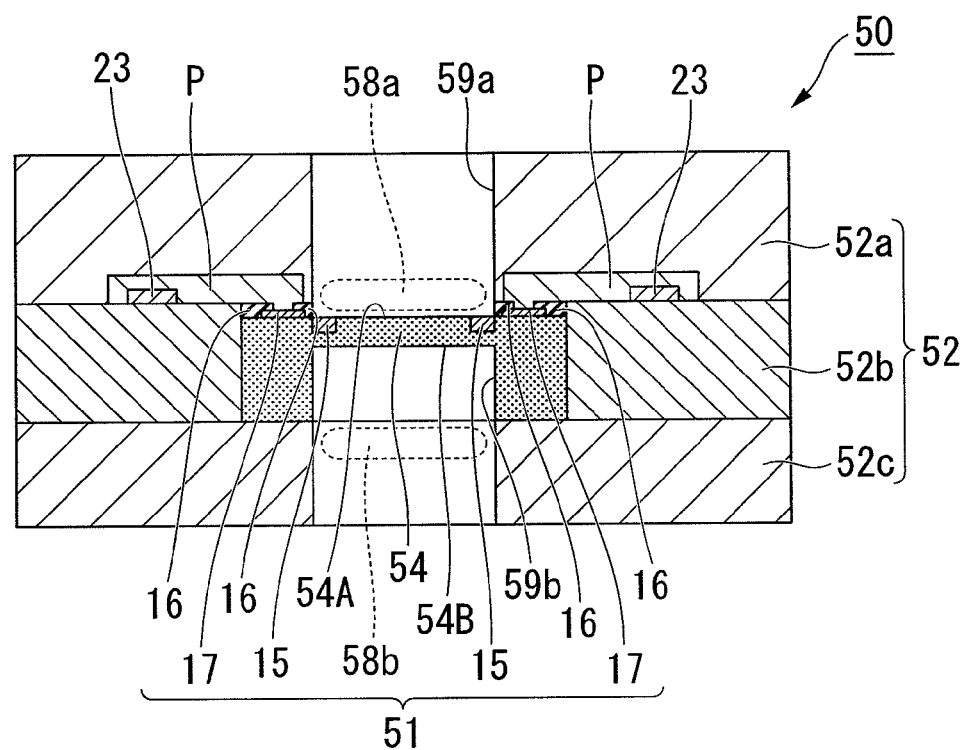
FIG. 6 is a sectional view illustrating another example of a pressure sensor module according to the present invention.

FIG. 6 is a sectional view illustrating another embodiment (hereinafter "fourth embodiment") of the pressure sensor module of the present invention. In this drawing, an oxide film 19 on a diaphragm portion and wiring 18 formed by means of diffusion are omitted. A pressure sensor module 50 of the fourth embodiment is composed of a pressure sensor 51 and a laminar substrate 52 which laminates substrates 52a, 52b and 52c in three layers, where the pressure sensor 51 is incorporated into the middle layer, that is, substrate 52b. In this fourth embodiment, one face 54A of a diaphragm portion 54 configuring the pressure sensor 51 is exposed by a space portion 58a, while the other face 54B of the diaphragm portion 54 is exposed by a space portion 58b (other face side space portion). That is, as a result of the two space portions 58a and 58b which sandwich the diaphragm portion 54, a mode is adopted where both faces of the diaphragm portion 54 are exposed.

Furthermore, a pressure inlet hole 59a which allows the space portion 58a to communicate with the exterior of the laminar substrate 52 is formed in the substrate 52a, while a pressure inlet hole 59b which allows the space portion 58b to communicate with the exterior of the laminar substrate 52 is formed in the substrate 52c. By this means, the one face 54A side of the diaphragm portion 54 communicates with one face 52A side of the laminar substrate 52 via the pressure inlet hole 59a, while the other face 54B side of the diaphragm portion 54 communicates with the other face 52B side of the laminar substrate 52 via the pressure inlet hole 59b.

According to the pressure sensor module 50 of the fourth embodiment, it is possible to have the functions of a pressure sensor module of the differential pressure type, which serves to measure the pressure difference between the one face 54A side and the other face 54B side of the diaphragm portion 54.

Fifth Embodiment

Figure 7:
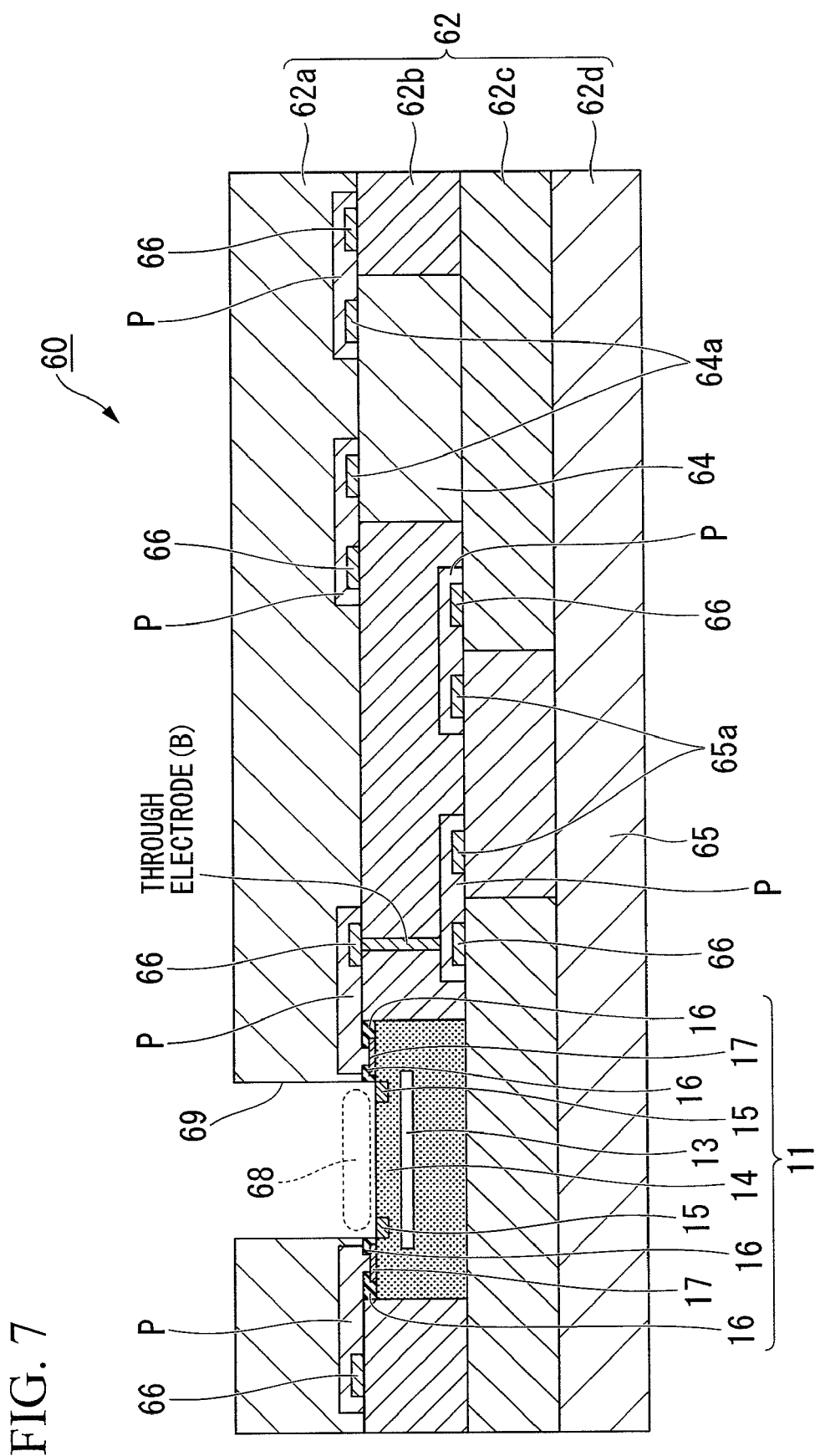
FIG. 7 is a sectional view illustrating another example of a pressure sensor module according to the present invention.

FIG. 7 is a sectional view illustrating another embodiment (hereinafter "fifth embodiment") of the pressure sensor module of the present invention. In this drawing, an oxide film 19 on a diaphragm portion and wiring 18 formed by means of diffusion are omitted. A pressure sensor module 60 of the fifth embodiment is composed of the pressure sensor 11 and a laminar substrate 62 which laminates substrates 62a, 62b, 62c and 62d in four layers, where the pressure sensor 11 is incorporated into the middle substrate 62b, and a space portion 68 which exposes one face of the diaphragm portion 14 configuring this pressure sensor 11 is formed. A pressure inlet hole 69 which allows the space portion 68 to communicate with the exterior of the laminar substrate 62 is formed in the substrate 62a laminated onto the substrate 62b.

A device 64 and a device 65 are respectively incorporated into the substrate 62b and substrate 62c. The device 64 and device 65 may be a voltage amplification circuit, temperature compensation circuit or the like of the pressure sensor 11, or another device of an ASIC or the like for controlling the pressure sensor 11. The electrodes 17 of the pressure sensor 11, an electrode 64a of the device 64 and an electrode 65a of the device 65 are electrically connected by wiring portions 66 formed in the laminar substrate 62 and, a conductive paste P or the like. The wiring portions are connected with each other via another wire circuit (not shown), a through electrode (B) where conductive material is filled in a through hole, and the like. Furthermore, in this embodiment, a laminar substrate that is the same as the laminar substrate of the first embodiment is employed.

According to the pressure sensor module 60 of the fifth embodiment, even when the pressure sensor 11 is incorporated into the middle of the laminar substrate 62, the diaphragm portion 14 of which one face is exposed by the space 68 is capable of detecting the external pressure of the laminar substrate 62 via the pressure inlet hole 69 formed in the laminar substrate 62. Also, by incorporating the pressure sensor 11 and the multiple devices 64 and 65 provided with control circuits (e.g., amplification circuit and temperature compensation circuit) for the pressure sensor 11 into the laminar substrate 62, the need for externally providing control circuits or the like for controlling the pressure sensor 11 is eliminated, and it is possible to obtain a systematized pressure sensor module 60 which is integrally provided with multiple chips.

Sixth Embodiment

Next, another embodiment of a pressure sensor module of the present invention will be described. The pressure sensor module of this embodiment is similar to that of the first embodiment, and common explanations will be omitted.

Figure 8:
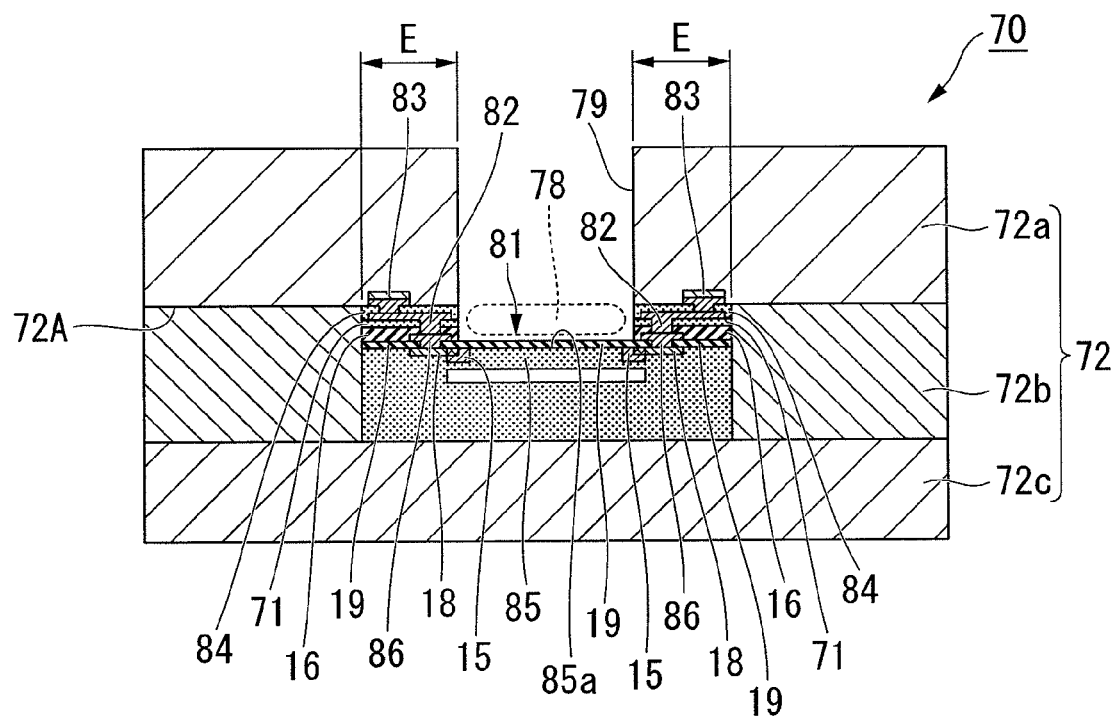
FIG. 8 is a sectional view illustrating another example of a pressure sensor module according to the present invention.

FIG. 8 is a sectional view illustrating another embodiment (hereinafter "sixth embodiment") of the pressure sensor module of the present invention. A pressure sensor module 70 of the sixth embodiment is composed of a pressure sensor 81 and a laminar substrate 72 which laminates substrates 72a, 72b and 72c in three layers, where the pressure sensor 81 is incorporated into the middle substrate 72b, and one face 85a of a diaphragm portion 85 configuring the pressure sensor 81 is exposed by a space portion 78.

A pressure inlet hole 79 which allows communication of the space portion 78 with the exterior of the laminar substrate 72 is formed in the substrate 72a laminated onto the substrate 72b. By this means, the one face 85a of the diaphragm portion 85 configuring the pressure sensor 81 communicates with the exterior of the laminar substrate 72 via the pressure inlet hole 79.

Electrodes 86 which are connected to the pressure-sensitive elements 15 are disposed in the vicinity of the diaphragm portion 85. Also, an insulator 71 covering the electrodes 86 is disposed in peripheral region E which is a region of the pressure sensor 81 excluding the diaphragm portion 85 so as to surround the diaphragm portion 85. The insulator 71 is made of material such as a polyimide resin, an epoxy resin, or a silicone resin. Furthermore, conductors 82 are formed on this insulator 71. These conductors 82 are formed by means of plating or the like, and electrically connect wiring portions (second wiring portions) 83 formed on the other face 72A side of the substrate 72a with the electrodes 86 of the pressure sensor 81 via a conductive paste, bump or the like. Moreover, a second insulator 84 covering the conductors 82 is formed by lamination onto the insulator 71. The second insulator 82 is made of material such as a polyimide resin, an epoxy resin, or a silicone resin. Furthermore, in this embodiment, a laminar substrate that is the same as the laminar substrate of the first embodiment is employed.

According to the pressure sensor module 70 of the sixth embodiment, even when the pressure sensor 81 is incorporated into the middle of the laminar substrate 72, the diaphragm portion 85 of which one face is exposed by the space portion 78 is capable of detecting the external pressure of the laminar substrate 72 via the pressure inlet hole 79 formed in the laminar substrate 72. Also, the insulator 71 is disposed in the peripheral region E which does not overlap with the diaphragm portion 85. As a result, even supposing that there are is unevenness due to the conductors 82 and the wiring portions (second wiring portions) 83 which are arranged by lamination onto the pressure sensor 81, one face side of the substrate 72b is leveled if the insulator 71 is provided so as to fill in the unevenness. In short, as the peripheral region E is uniformly covered by the insulator 71, the pressure sensor 81 is in a state where it is reliably fixed by the laminar substrate 72 due to interposition between the substrate 72a and substrate 72c in the vertical direction, and encirclement of its circumference by the substrate 72b. Consequently, it is possible to reduce the impact of stress on the diaphragm portion 85 from the insulator 71.

Seventh Embodiment

Figure 9A:
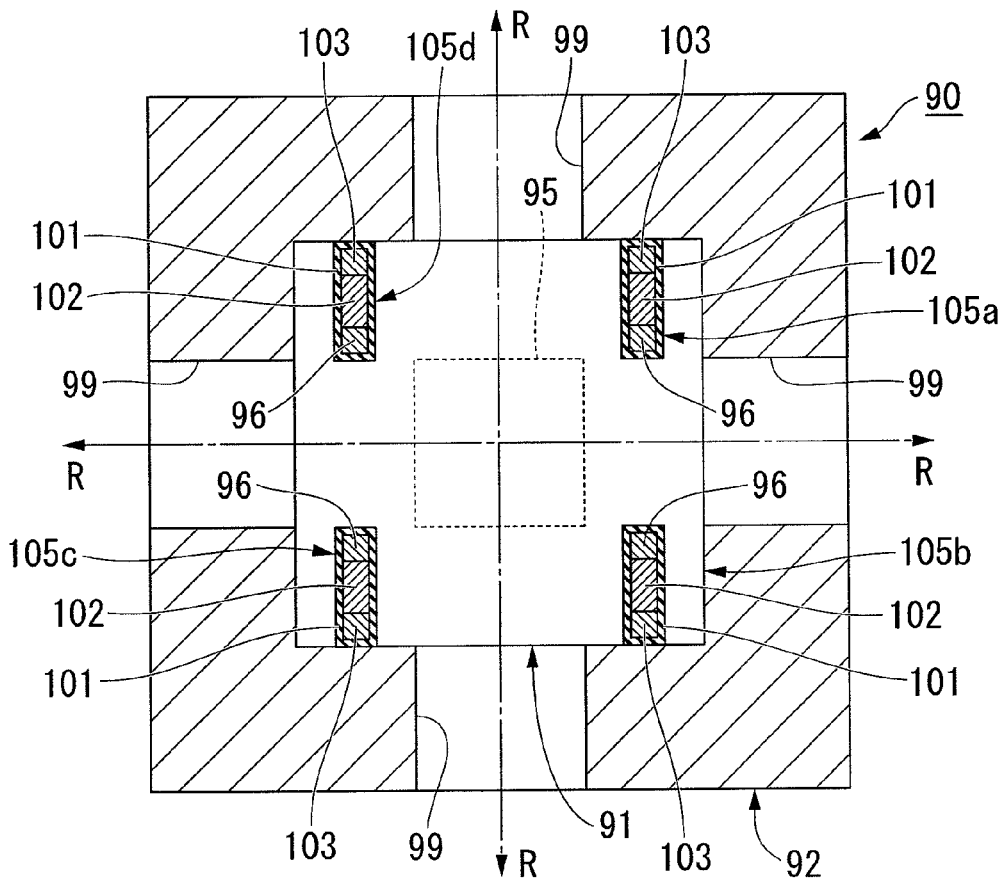
FIG. 9A is a plan view illustrating another example of a pressure sensor module according to the present invention.
Figure 9B:
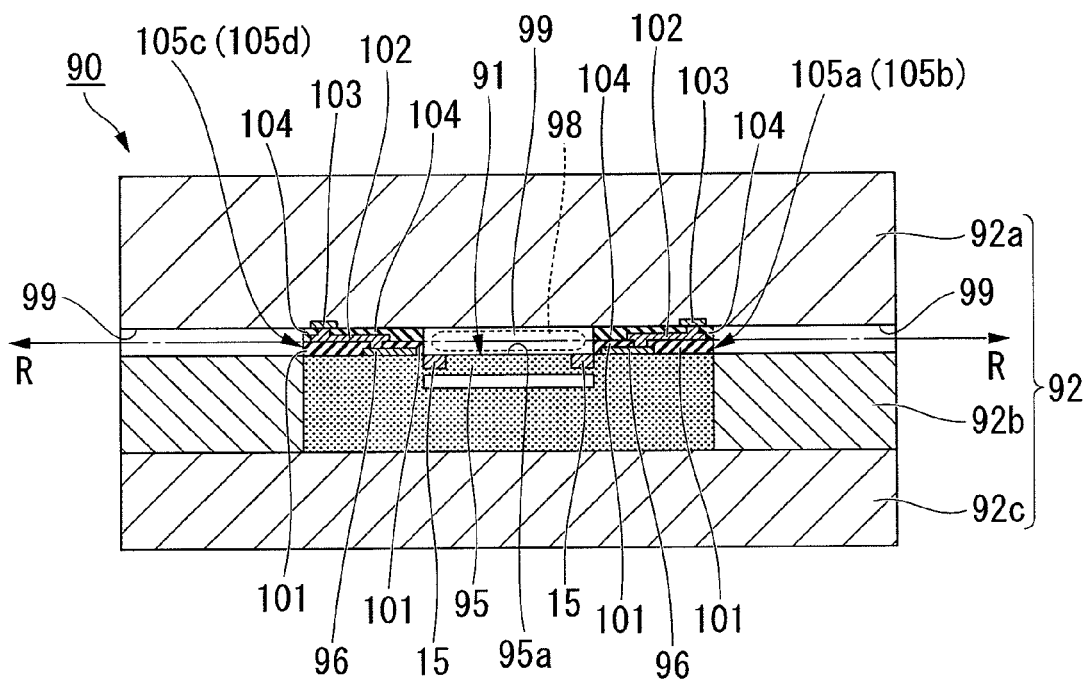
FIG. 9B is a sectional view illustrating another example of a pressure sensor module according to the present invention.

FIGS. 9A and 9B show a modified example (hereinafter "seventh embodiment") of the pressure sensor module of the present invention shown in FIG. 8. Material of a laminar substrate, connection state between electrodes and wiring portions, or the like are the same as those in the sixth embodiment. In these drawings, an oxide film 19 on a diaphragm portion, an insulating film 16 (passivation film), and wiring 18 formed by means of diffusion are omitted. FIG. 9A is a plan view of the pressure sensor module when viewed from above in a state where the uppermost substrate of the substrates configuring the laminar substrate is removed. FIG. 9B is a side profile of the pressure sensor module. A pressure sensor module 90 of the seventh embodiment is composed of a pressure sensor 91 and a laminar substrate 92 which laminates substrates 92a, 92b and 92c in three layers, where the pressure sensor 91 is incorporated into the middle substrate 92b (this is one example of above-referenced mode A). One face 95a of a diaphragm portion 95 configuring the pressure sensor 91 is exposed by a space portion 98.

Within the laminar substrate 92, a pressure inlet hole 99 is formed between the substrate 92b and the substrate 92a laminated thereon. This pressure inlet hole 99 extends along the one face 95a of the diaphragm portion 95 configuring the pressure sensor 91, and allows communication of the space portion 98 and the exterior of the laminar substrate 92. By means of this pressure inlet hole 99, the external pressure of the laminar substrate 92 is guided to the diaphragm portion 95 of the pressure sensor 91 disposed at the center of the laminar substrate 92.

Electrodes 96 which are connected to the pressure-sensitive elements 15 are disposed in the vicinity of the diaphragm portion 95, and an insulator 101 is disposed in insular pieces at the outer sides of the diaphragm portion 95 so as to cover the electrodes 96. Furthermore, a conductor 102 is formed in insular pieces on one face of each of these insular pieces of the insulator 101. These conductors 102 electrically connect wiring portions 103 formed on the substrate 92a and the electrodes 96 of the pressure sensor 91. Moreover, second insulators 104 are superimposed on the insulators 101 so as to cover the conductors 102. As a result of this insulator 101, wiring portion 103 and second insulator 104 which are formed at respective positions corresponding to the electrodes 96, multiple insular parts 105a-105d are formed.

The pressure inlet hole 99 which extends along the one face 95a of the diaphragm portion 95 forms a crosswise pressure inlet path R that transits the multiple insular parts 105a-105d and connects the diaphragm portion 95 and the exterior of the laminar substrate 92. By means of this pressure inlet path R, the external pressure of the laminar substrate 92 is guided to the diaphragm portion 95.

The pressure sensor module 90 of the seventh embodiment is provided with the multiple insular parts 105a-105d which are formed by the insulator 101, wiring portion 103 and second insulator 104 and are located at positions corresponding to the respective electrodes 96 of the pressure sensor 91, and the pressure inlet hole 99 which extends along the one face 95a of the diaphragm portion 95 and transits these insular parts 105a-105d. By this configuration, for example, it also becomes possible to smoothly guide a pressure medium or the like through positions between the insular parts 105a-105d to the diaphragm portion 95.

Moreover, by dividing the insulator 101 and second insulator 104 into the insularly formed multiple insular parts 105a-105d, it becomes possible to disperse the stress imparted to the insulator 101 and second insulator 104. By this means, it is possible to prevent the diaphragm portion 95 from sustaining unnecessary stress and bending, and to accurately detect the external pressure of the laminar substrate 92.

Furthermore, by forming the pressure inlet hole 99 to extend along the one face 95a of the diaphragm portion 95, it is possible to prevent the direct incidence of external light on the diaphragm portion 95. Generally, the conductivity of semiconductors varies according to light, but it is possible to prevent external light from directly striking the diaphragm portion 95 by adopting a configuration in the seventh embodiment where the pressure inlet hole 99 is formed extending along the one face 95a of the diaphragm portion 95 such that the diaphragm portion 95 is not directly exposed from the laminar substrate 92 to the outside. As a result, even when external light strikes the laminar substrate 92, its effects are not experienced in the diaphragm portion 95, and pressure detection can be conducted with a high degree of accuracy.

Eighth Embodiment

Figure 10:
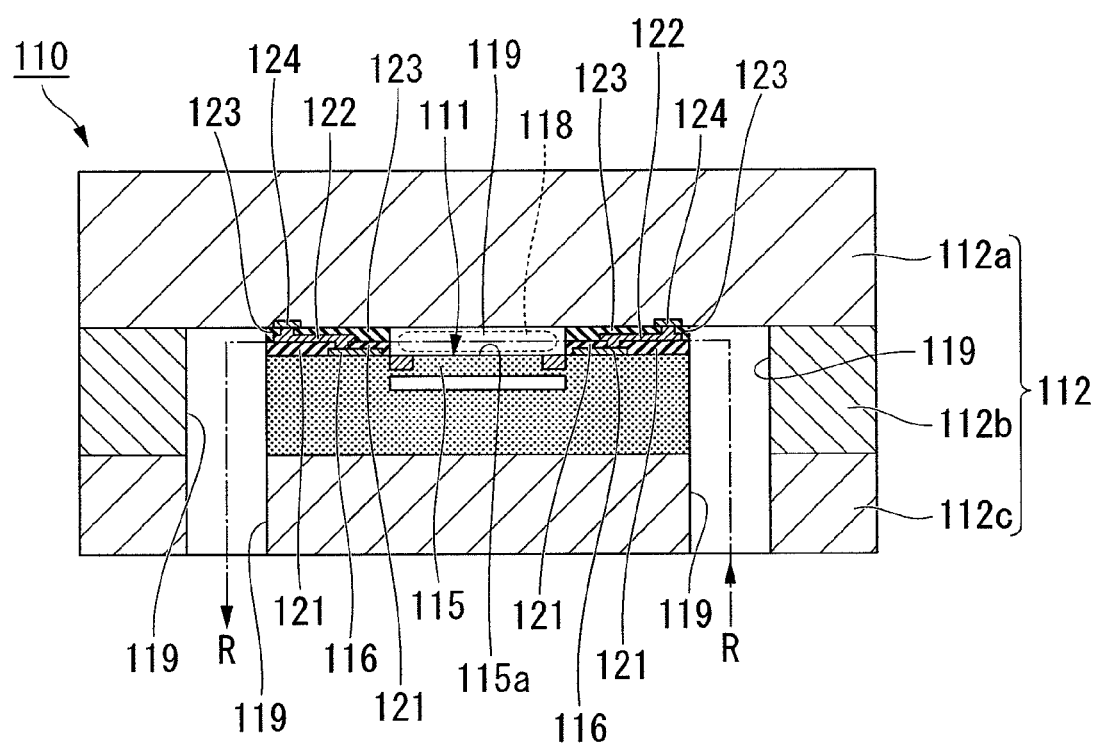
FIG. 10 is a sectional view illustrating another example of a pressure sensor module according to the present invention.

FIG. 10 is a modified example (hereinafter "eighth embodiment") of the pressure sensor module of the present invention shown in FIGS. 9A and 9B. Material of a laminar substrate, connection between electrodes and wiring portions, or the like are the same as those in the seventh embodiment. In this drawing, an oxide film 19 on a diaphragm portion, an insulating film 16 (passivation film), and wiring 18 formed by means of diffusion are omitted. A pressure sensor module 110 of the eighth embodiment is composed of a pressure sensor 111 and a laminar substrate 112 which laminates substrates 112a, 112b and 112c in three layers, where the pressure sensor 111 is incorporated into the middle substrate 112b. One face 115a of a diaphragm portion 115 configuring the pressure sensor 111 is exposed by a space portion 118.

Within the laminar substrate 112, a pressure inlet hole 119 leading to the space portion 118 is formed between the substrate 112b and the substrate 112a laminated thereon. At least a portion of this pressure inlet hole 119 that connects with the space portion 118 extends along the one face 115a of the diaphragm portion 115 configuring the pressure sensor module 110. Furthermore, this pressure inlet hole 119 extends so as to pass through the substrate 112b and substrate 112c in the vertical direction relative to the one face 115a of the diaphragm portion 115, and both ends of this pressure inlet hole 119 face the exterior of the laminar substrate 112 at the substrate 112c. That is, the pressure inlet hole 119 in its entirety is approximately U-shaped, and the one face 115a of the diaphragm portion 115 is exposed at the space portion 118 arranged in the central part of the path of the pressure inlet hole 119.

In addition, electrodes 116 are formed in the vicinity of the diaphragm portion 115, and multiple insular parts 125a-125d each of which is formed of a insulator 121, conductor 122, and second insulator 123 are formed corresponding to the respective electrodes 116. The conductors 122 electrically connect the electrodes 116 with wiring portions 124 formed on the laminar substrate 112. The pressure inlet hole 119 forms so the pressure inlet path R which transits these multiple insular parts 125a-125d, and allows the space portion 118 which exposes the one face 115a of the diaphragm portion 115 to communicate with the exterior of the laminar substrate 112, the pressure inlet path R being approximately U-shaped with the interim channels thereof bent.

The pressure inlet hole 119 forms the pressure inlet path R which extends along the one face 115a of the diaphragm portion 115 in the region of connection with the space portion 118; it then bends from there, and extends in the thickness direction of the laminar substrate 112, the pressure inlet path R being approximately U-shaped with the interim channels thereof bent. As a result, it is possible to reliably prevent the incidence of external light from outside the laminar substrate 112 onto the diaphragm portion 115. By bending the path of the pressure inlet hole 119 so that external light does not reach the diaphragm portion 115, it is possible to prevent a reduction in the pressure detection accuracy of the diaphragm portion 115 due to the incidence of external light, and to conduct the detection of pressure with a high degree of accuracy.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

INDUSTRIAL APPLICABILITY

According to the pressure sensor module of the present invention, by forming a space portion which causes the pressure sensor to be incorporated into the laminar substrate, it is possible to provide a pressure sensor module which enables high-density packaging, and which obtains significantly greater compactness and thinness compared to conventional pressure sensor modules which mount the pressure sensor on the exterior of the substrate. Moreover, as the space portion of the pressure sensor module is formed so as to expose at least one face of the diaphragm portion, the pressure sensor is able to reliably detect the pressure imparted to the diaphragm portion in a state where the pressure sensor is located within the laminar substrate.

Furthermore, by forming a wiring portion in the laminar substrate which electrically connects with the electrodes of the pressure sensor, it is possible to directly connect the output current from the pressure sensor to an output voltage amplification circuit, temperature compensation circuit and the like formed in the laminar substrate without resorting to a connection method such as wire bonding, thereby enabling enhancement of reliability as well as obtainment of significantly greater compactness and thinness of the pressure sensor module.

The invention claimed is:

1. A pressure sensor module comprising:
    a pressure sensor which has a diaphragm portion where a portion of a semiconductor substrate is sheeted, and which has an electrode arranged in the vicinity of the diaphragm portion; and
    a laminar substrate which has a first cavity within which the pressure sensor is disposed, and which has a space portion that exposes at least one face of the diaphragm portion and a wiring portion that is electrically connected to the electrode.

2. The pressure sensor module according to claim 1, wherein a pressure inlet hole which allows communication of the space portion and the exterior of the laminar substrate is provided in the laminar substrate.

3. The pressure sensor module according to claim 1, further comprising:
    an insulator which is disposed in a peripheral region of the semiconductor substrate excluding the diaphragm portion; and
    a conductor which is disposed on the insulator and which electrically connects the electrode and the wiring portion.

4. The pressure sensor module according to claim 2, wherein at least a portion of the pressure inlet hole that connects with the space portion extends in a direction along the one face of the diaphragm portion.

5. The pressure sensor module according to claim 3, wherein the insulator is divided into a plurality of insular parts.

6. The pressure sensor module according to claim 1,
    further comprising a device comprising an electrode electrically connected to the wiring portion of the laminar substrate,
    wherein the device is disposed within a second cavity of the laminar substrate.

* * * * *